United States Patent
Gatti (10) Patent No.: US 10,110,623 B2
(45) Date of Patent: Oct. 23, 2018

(54) DELAYING PHISHING COMMUNICATION

(71) Applicant: Bank of America Corporation, Charlotte, NC (US)

(72) Inventor: Benjamin L. Gatti, Lake Park, NC (US)

(73) Assignee: Bank of America Corporation, Charlotte, NC (US)

( * ) Notice: Subject to any disclaimer, the term of this patent is extended or adjusted under 35 U.S.C. 154(b) by 254 days.

(21) Appl. No.: 14/805,548

(22) Filed: Jul. 22, 2015

(65) Prior Publication Data

US 2017/0026399 A1    Jan. 26, 2017

(51) Int. Cl.
*H04L 29/06* (2006.01)
*H04L 12/58* (2006.01)

(52) U.S. Cl.
CPC .......... *H04L 63/1433* (2013.01); *H04L 51/12* (2013.01); *H04L 63/1483* (2013.01); *H04L 51/00* (2013.01)

(58) Field of Classification Search
CPC ............. H04L 63/1433; H04L 63/1441; H04L 63/1483
See application file for complete search history.

(56) References Cited

U.S. PATENT DOCUMENTS

| | | | |
|---|---|---|---|
| 7,356,364 B1 | 4/2008 | Hartselle et al. | |
| 7,499,976 B2 | 3/2009 | Cato | |
| 7,603,718 B2 | 10/2009 | Rounthwaite et al. | |
| 7,908,328 B1 | 3/2011 | Hulten et al. | |
| 7,925,883 B2 | 4/2011 | Florencio et al. | |
| 7,930,289 B2 | 4/2011 | Cheshire | |
| 8,041,769 B2 | 10/2011 | Shraim et al. | |
| 8,255,468 B2 | 8/2012 | Vitaldevara et al. | |
| 8,352,318 B2 | 1/2013 | Rikhtverchik et al. | |
| 8,381,292 B1 | 2/2013 | Warner et al. | |
| 8,484,741 B1 | 7/2013 | Chapman | |
| 8,613,807 B2 | 12/2013 | Higbee et al. | |

(Continued)

OTHER PUBLICATIONS

Prakash et al., A Reputation-Based Approach for Efficient Filtration of Spam, 2011, Cloudmark, Inc.,pp. 1-13, downloaded from https://www.cloudmark.com/en/s/resources/whitepapers/reputation-based-approach-for-efficient-filtration-of-spam on Sep. 13, 2016.*

*Primary Examiner* — Carl G Colin
*Assistant Examiner* — Gary E Lavelle
(74) *Attorney, Agent, or Firm* — Michael A. Springs (57) ABSTRACT

According to one embodiment, an apparatus is configured to store a plurality of phishing scores, each phishing score of the plurality of phishing scores indicating a likelihood that a user of a plurality of users will respond to a phishing email. The apparatus is configured to receive an email, to select a first subset of the plurality of users based on the phishing score of each user in the first subset, and to select a second subset of the plurality of users based on the phishing score of each user in the second subset, wherein each user in the second subset is determined to be more likely to respond to a phishing email than each user in the first subset. The apparatus is configured to communicate the email to the first subset and to communicate the email to the second subset based on the first subset's responses to the email.

12 Claims, 3 Drawing Sheets

(56) References Cited

U.S. PATENT DOCUMENTS

| | | | |
|---|---|---|---|
| 8,621,614 B2 * | 12/2013 | Vaithilingam | G06Q 10/107 |
| | | | 713/154 |
| 8,633,666 B2 | 1/2014 | Curnyn | |
| 8,635,703 B1 | 1/2014 | Belani et al. | |
| 8,640,231 B2 | 1/2014 | Florencio et al. | |
| 8,689,341 B1 | 4/2014 | Hartmann et al. | |
| 8,695,100 B1 | 4/2014 | Cosoi | |
| 8,719,940 B1 | 5/2014 | Higbee et al. | |
| 8,793,799 B2 | 7/2014 | Fritzson et al. | |
| 8,910,287 B1 | 12/2014 | Belani et al. | |
| 8,966,637 B2 | 2/2015 | Belani et al. | |
| 9,027,126 B2 * | 5/2015 | Larkins | G06F 21/554 |
| | | | 713/182 |
| 9,367,872 B1 * | 6/2016 | Visbal | G06Q 40/00 |
| 2002/0169835 A1 * | 11/2002 | Paul, Jr. | G06F 17/30876 |
| | | | 709/206 |
| 2008/0172738 A1 * | 7/2008 | Bates | G06F 17/30887 |
| | | | 726/22 |
| 2011/0231529 A1 * | 9/2011 | Yates | G06Q 10/107 |
| | | | 709/220 |
| 2011/0246583 A1 * | 10/2011 | Vitaldevara | G06Q 10/107 |
| | | | 709/206 |
| 2012/0046937 A1 | 2/2012 | Ocke et al. | |
| 2012/0124671 A1 * | 5/2012 | Fritzson | G06F 21/577 |
| | | | 726/26 |
| 2013/0297375 A1 | 11/2013 | Chapman | |
| 2014/0199663 A1 * | 7/2014 | Sadeh-Koniecpol | G09B 5/00 |
| | | | 434/118 |
| 2014/0337995 A1 | 11/2014 | Fritzson et al. | |
| 2015/0012351 A1 | 1/2015 | Harding | |
| 2015/0229664 A1 * | 8/2015 | Hawthorn | H04L 63/1408 |
| | | | 726/25 |
| 2016/0014151 A1 * | 1/2016 | Prakash | H04L 63/1483 |
| | | | 726/22 |
| 2016/0301705 A1 * | 10/2016 | Higbee | H04L 63/1416 |

* cited by examiner

DELAYING PHISHING COMMUNICATION

TECHNICAL FIELD

This disclosure relates generally to a system for handling phishing emails.

BACKGROUND

Phishing emails and phishing campaigns place computing systems and networks at risk.

SUMMARY OF THE DISCLOSURE

According to one embodiment, an apparatus includes a memory and a processor. The memory is configured to store a plurality of phishing scores, each phishing score of the plurality of phishing scores indicating a likelihood that a user of a plurality of users will respond to a phishing email. The processor is communicatively coupled to the memory and is configured to receive an email. The processor is further configured to select a first subset of the plurality of users based on the phishing score of each user in the first subset and to select a second subset of the plurality of users based on the phishing score of each user in the second subset, wherein each user in the second subset is determined to be more likely to respond to a phishing email than each user in the first subset. The processor is also configured to communicate the email to the first subset and to communicate the email to the second subset based on the first subset's responses to the email.

According to another embodiment, a method includes storing, by a memory, a plurality of phishing scores, each phishing score of the plurality of phishing scores indicating a likelihood that a user of a plurality of users will respond to a phishing email. The method further includes receiving an email and selecting, by a processor communicatively coupled to the memory, a first subset of the plurality of users based on the phishing score of each user in the first subset. The method also includes selecting, by the processor, a second subset of the plurality of users based on the phishing score of each user in the second subset, wherein each user in the second subset is determined to be more likely to respond to a phishing email than each user in the first subset, communicating the email to the first subset, and communicating the email to the second subset based on the first subset's responses to the email.

According to another embodiment, a system includes a plurality of users and a phishing management device configured to store, by a memory, a plurality of phishing scores, each phishing score of the plurality of phishing scores indicating a likelihood that a user of a plurality of users will respond to a phishing email. The phishing management device is further configured to receive an email and select, by a processor communicatively coupled to the memory, a first subset of the plurality of users based on the phishing score of each user in the first subset. The phishing management device is also configured to select, by the processor, a second subset of the plurality of users based on the phishing score of each user in the second subset, wherein each user in the second subset is determined to be more likely to respond to a phishing email than each user in the first subset, communicate the email to the first subset, and communicate the email to the second subset based on the first subset's responses to the email.

Certain embodiments may provide one or more technical advantages. For example, an embodiment may reduce the chances of spreading a phishing email. As another example, an embodiment may reduce the effectiveness of phishing emails. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
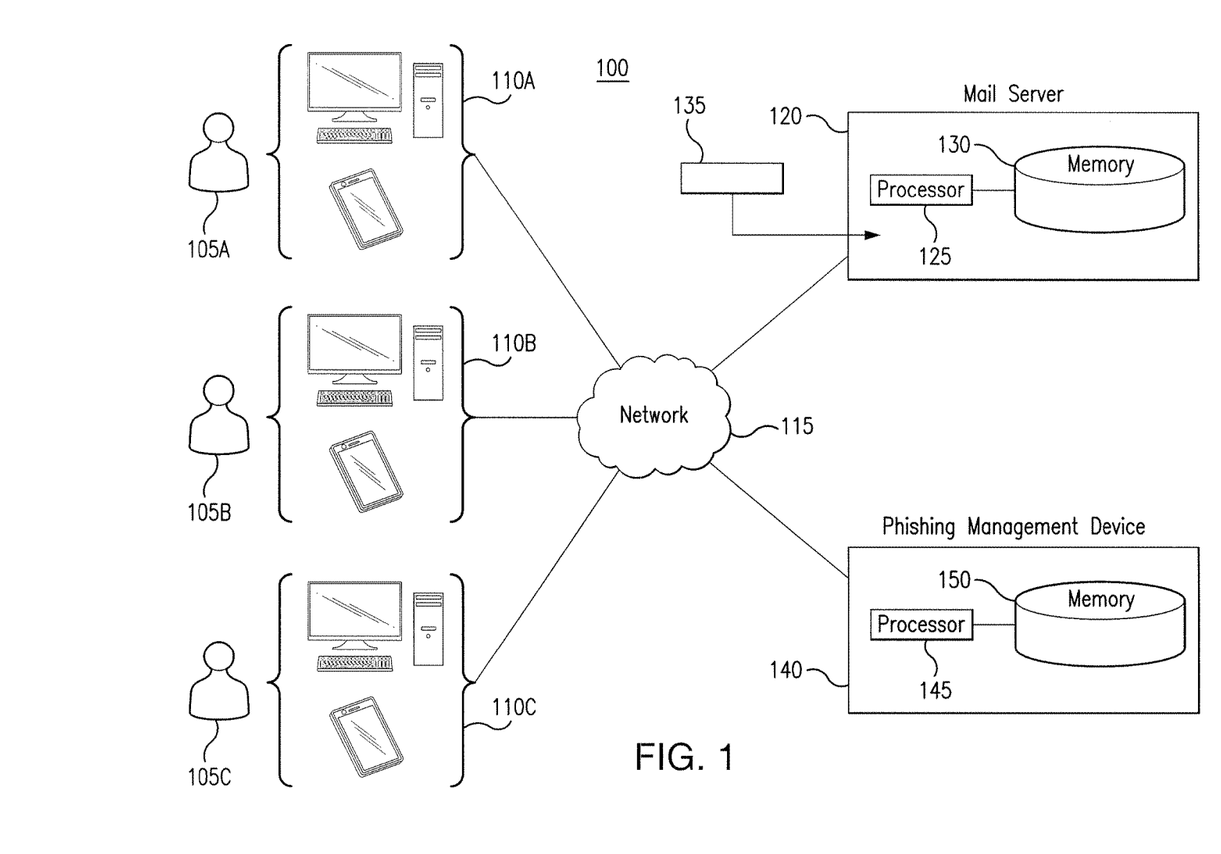
FIG. 1 illustrates a system for handling phishing emails.
Figure 2:
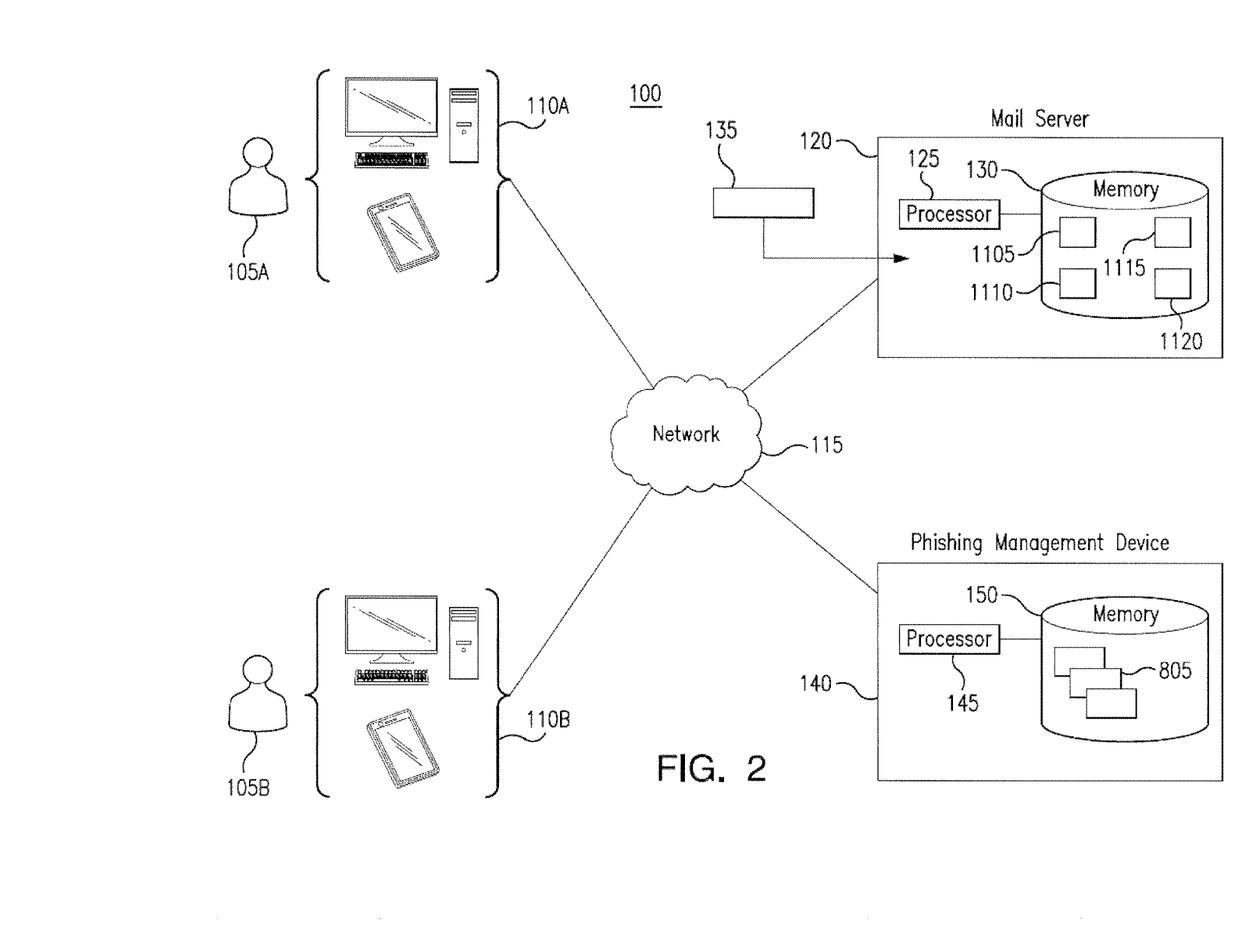
FIG. 2 illustrates delaying phishing emails using the system of FIG. 1.
Figure 3:
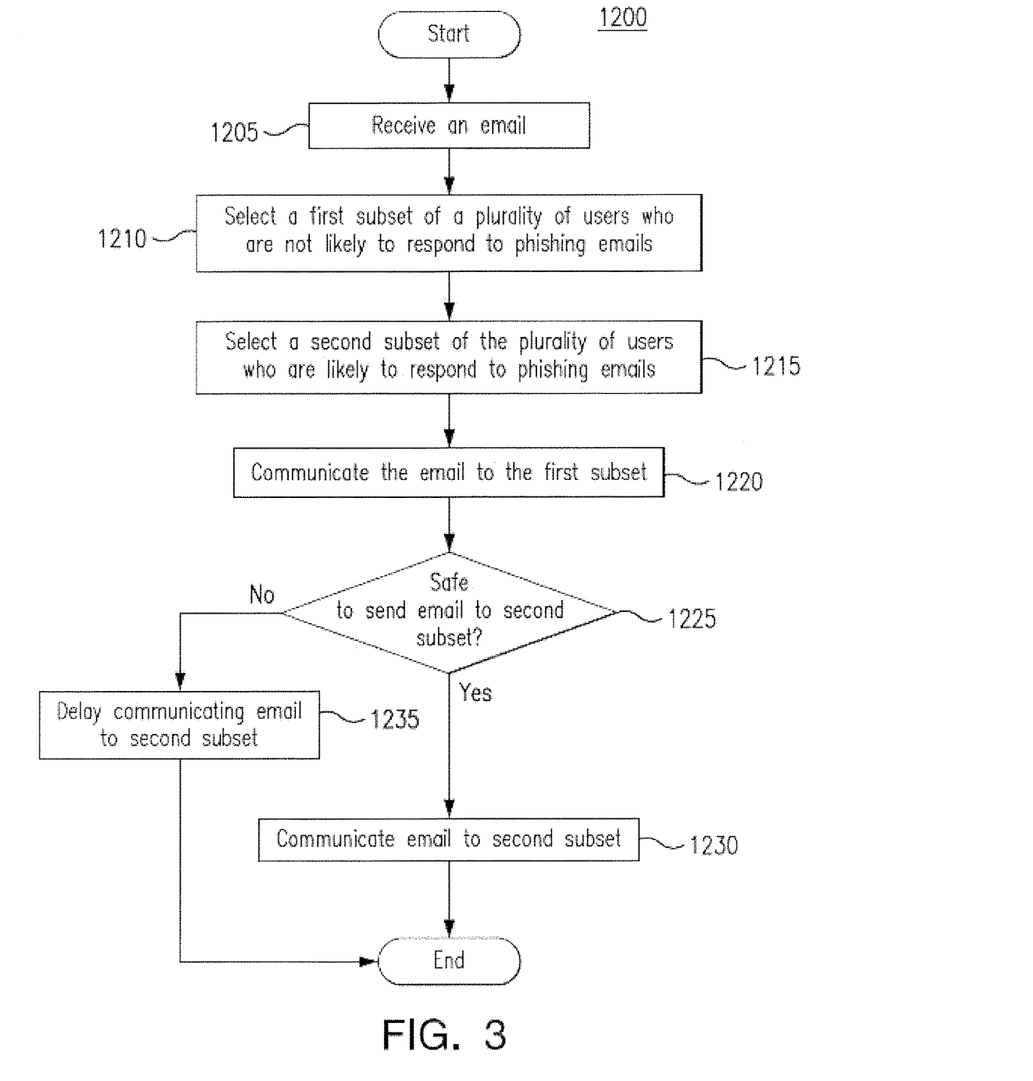
FIG. 3 is a flowchart illustrating a method of delaying phishing emails using the system of FIG. 1.

Embodiments of the present disclosure and its advantages are best understood by referring to FIGS. 1 through 3 of the drawings, like numerals being used for like and corresponding parts of the various drawings.

Phishing scams place computing systems and networks at substantial risk. Phishing typically involves the sending of emails and/or messages that attempt to deceive the recipient into providing personally identifiable information, passwords, and any other information that, when known by an unauthorized party, may threaten the security of the system and/or network. Phishing may also involve sending emails and/or messages that deceive the recipient into installing viruses and/or worms onto the recipient's device. Because the success of a phishing scam may depend on the response of only one recipient and because the number of recipients may be large, it may be difficult to prevent a phishing scam from jeopardizing the security of a system and/or network. For example, if a phishing email is sent to one thousand users on a network it may be difficult to ensure that all one thousand users do not fall victim to the phishing email.

This disclosure provides a system that may reduce the chances that a user falls victim to a phishing scam. For example, the system may delay or prevent communicating emails to groups of users who are more likely to respond to phishing emails based on how another group of users who are less likely to respond to phishing emails treats those emails. In certain embodiments, by using this system, various technical advantages may be realized. For example, in one embodiment using the system may reduce the chances of spreading a phishing email. As another example, in another embodiment the system may reduce the effectiveness of phishing emails. The system will be described generally using FIG. 1. The various functions performed by the system will be described in more detail using FIGS. 2 and 3. Although this disclosure primarily describes phishing within the context of email, this disclosure contemplates phishing scams within any messaging context including text messaging, chat messaging, and/or any other appropriate messaging scheme.

FIG. 1 illustrates a system 100 for handling phishing emails. As provided in FIG. 1, system 100 includes users 105A, 105B and 105C, devices 110A, 110B, and 110C, network 115, mail server 120, and phishing management device 140. The components of system 100 may be communicatively coupled to each other through network 115.

For ease of illustration, the number of illustrated components of system 100 is limited, but this disclosure contemplates system 100 including any number of users 105, devices 110, networks 115, mail servers 120, and phishing management devices 140.

A user 105 may use device 110 to perform various functions related to email. For example, user 105 may use device 110 to compose email, read email, reply and/or forward email, and/or delete email. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 may facilitate communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Mail server 120 may handle the email traffic of system 100. As provided in FIG. 1, mail server 120 may include a processor 125 and a memory 130. Processor 125 and memory 130 may be communicatively coupled to each other. This disclosure contemplates processor 125 and memory 130 being configured to perform any of the functions of mail server 120 described herein. For example, processor 125 and memory 130 may be configured to receive email and/or store email.

Processor 125 may execute software stored on memory 130 to perform any of the functions described herein. Processor 125 may control the operation and administration of mail server 120 by processing information received from network 115, device 110, and memory 130. Processor 125 may include any hardware and/or software that operates to control and process information. Processor 125 may be a programmable logic device, a microcontroller, a microprocessor, any suitable processing device, or any suitable combination of the preceding.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Mail server 120 may manage the email traffic of system 100. For example, mail server 120 may receive an email 135. Mail server 120 may then determine which user 105 is the intended recipient of email 135. Mail server 120 may then deliver email 135 to the appropriate device 110. Mail server 120 may also store email 135. When a user 105 uses device 110 to reply, forward, and/or delete email 135, mail server 120 may receive a command from the device 110. Mail server 120 may then respond appropriately to the command.

Phishing management device 140 may track and/or handle phishing emails received by system 100. As provided in FIG. 1, phishing management device 140 includes a processor 145 and a memory 150. This disclosure contemplates processor 145 and memory 150 being configured to perform any of the functions of phishing management device 140 described herein. Processor 145 may be communicatively coupled to memory 140.

Processor 145 may execute software stored on memory 150 to perform any of the functions described herein. Processor 145 may control the operation and administration of phishing management device 140 by processing information received from network 115, device 110, and memory 150. Processor 145 may include any hardware and/or software that operates to control and process information. Processor 145 may be a programmable logic device, a microcontroller, a microprocessor, any suitable processing device, or any suitable combination of the preceding.

Memory 150 may store, either permanently or temporarily, data, operational software, or other information for processor 145. Memory 150 may include any one or a combination of volatile or non-volatile local or remote devices suitable for storing information. For example, memory 150 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 150, a disk, a CD, or a flash drive. In particular embodiments, the software may include an application executable by processor 145 to perform one or more of the functions described herein.

System 100 may perform various functions to reduce the effectiveness of phishing scams. For example, system 100 may delay communicating certain emails to certain users who, based on their phishing scores, are more likely than other users to respond to phishing emails. System 100 may determine whether to communicate those emails to these users based on how users who are less likely to respond to phishing emails handle similar emails. Delaying phishing emails is discussed in more detail using FIGS. 2 and 3.

FIGS. 2 and 3 illustrate delaying phishing emails using the system 100 of FIG. 1. As discussed previously, system 100 may identify particular users who are more likely to respond to phishing emails based on those users' phishing scores. Because these users are more likely to respond to phishing emails, system and/or network security may be improved in certain instances by screening emails that are sent to these users. However, screening every email for a large number of users may be resource intensive and unfeasible.

System 100 may improve security by delaying emails to users who are more likely to respond to phishing emails based on the actions of users who are less likely to respond to phishing emails. For example, system 100 may first send an email to users who are less likely to respond to phishing emails based on their phishing scores. System 100 may then evaluate how those users handle the email before sending the email to users are more likely to respond to phishing emails. As an example, if the users who are less likely to respond to phishing emails delete the email and/or report the email as a phishing email, system 100 may delay indefinitely communicating the email to the users who are more likely to respond to phishing emails. As another example, if the users who are less likely to respond to phishing emails reply to the email and/or save the email, then system 100 may communicate the email to the users who are more likely to respond to phishing emails. In this manner, the security of system 100 may be improved.

FIG. 2 illustrates delaying phishing emails using the system 100 of FIG. 1. As provided in FIG. 2, system 100 may delay communicating a received email 135 to certain users based on those users' phishing scores 805. In this manner the security of system 100 and/or network 115 may be improved.

Mail server 120 may receive an email 135 intended for users 105A and 105B. In particular embodiments, mail server 120 may notify phishing management device 140 of email 135. Email 135 may be a phishing email or it may be a safe email. In particular embodiments, mail server 120 may communicate email 135 to phishing management device 140. Phishing management device 140 may not know whether email 135 is safe or not upon receiving email 135. However, phishing management device 140 may use phishing scores 805 to determine whether email 135 is safe or not.

Phishing management device 140 may store a plurality of phishing scores 805 in memory 150. Phishing scores 805 may correspond to users 105A, 105B and 105C. This disclosure contemplates phishing management device 140 storing any appropriate number of phishing scores 805 for any appropriate number of users 105. Each phishing score 805 may indicate how likely a user 105 will respond to a phishing email. For example, if a user's 105 phishing score 805 is high, it may indicate that that user 105 is more likely to respond to a phishing email. If a user's 105 phishing score 805 is low, it may indicate that that user 105 is less likely to respond to a phishing email.

Phishing management device 140 may use phishing scores 805 to first determine which users 105 of the intended recipients of email 135 are more likely to respond to a phishing email. Phishing management device 140 may also use phishing scores 805 to determine which users of the intended recipients of email 135 are less likely to respond to phishing emails. As an example, phishing management device 140 may determine that user 105A is more likely to respond to phishing emails and that user 105B is less likely to respond to phishing emails.

In particular embodiments, phishing scores 805 may be determined by analyzing a response rate of users 105 to various phishing emails. For example, phishing management device 140 may communicate fake and/or training phishing emails to users 105. Based on each user's response rate to the training email, phishing management device 140 may determine a phishing score 805 for that user 105. If the response rate for a particular user 105 is high, phishing management device 140 may assign a phishing score 805 for that user that indicates that that user 105 is more likely to respond to phishing emails.

In particular embodiments, phishing scores 805 may be determined by analyzing a deletion rate of a plurality of users 105A, 105B and 105C to a plurality of phishing emails. For example, if a user 105A deletes phishing emails frequently then phishing score 805 may be lower for user 105A because user 105A has demonstrated that he is less likely to respond to a phishing email. On the other hand and as another example, if user 105C has a low deletion rate for phishing emails, then phishing score 805 may be higher for user 105C because use 105C has demonstrated that he is more likely to respond to a phishing email.

Phishing management device 140 may delay communicating email 135 to users 105 who are more likely to respond to phishing emails. Using the previous example, because user 105A is more likely to respond to phishing emails, phishing management device 140 may delay communicating email 135 to user 105A. Instead, phishing management device 140 may first communicate email 135 to user 105B because user 105B is less likely to respond to phishing emails. This disclosure contemplates phishing management device 140 delaying communication of email 135 in any appropriate manner. For example, phishing management device 140 may instruct mail server 120 to store email 135 in particular folders in order to delay communication. In the illustrated example of FIG. 11, mail server 120 may store a received folder 1105 and a delay folder 1110 for user 105A and a received folder 1115 and a delay folder 1120 for user 105B. By placing email 135 in received folder 1105 or 1115 or delay folder 1110 or 1120, mail server 120 may communicate email 135 to a user 105 or delay communicating email 135 to a user 105. In the illustrated example, if mail server 120 places email 135 in delay folder 1110 and receive folder 1115, mail server 120 may be delaying communication of email 135 to user 105A while communicating email 135 to user 105B. This disclosure contemplates received folder 1105 and 1115 and delay folder 1110 and 1120 being stored in any appropriate component of system 100 such as phishing management device 140.

After email 135 is communicated to users who are less likely to respond to a phishing email, phishing management device 140 may monitor how those users handle email 135 to determine whether email 135 should be communicated to users who are more likely to respond to a phishing email. Using the previous example, phishing management device 140 may determine that user 105B has deleted email 135 and/or reported email 135 as a phishing email. In response, phishing management device 140 may delay indefinitely communicating email 135 to user 105A because it is likely that email 135 is a phishing email. Phishing management device 140 may instruct that email 135 be stored in delay folder 1110 indefinitely, and/or phishing management device 140 may instruct that email 135 be deleted from delay folder 1110. As another example, phishing management device 140 may determine that user 105B replied to email 135 and/or saved email 135. As a result, phishing management device 140 may determine that email 135 is less likely to be a phishing email and instruct that email 135 should be communicated to user 105A. In certain embodiments, phishing management device 140 may instruct that email 135 be moved from delay folder 1110 to received folder 1105. User 105A may then receive and/or read email 135. In this manner, the security of system 100 and/or network 115 may be improved because emails 135 that are likely to be phishing emails may not be communicated to users 105 who are more likely to respond to phishing emails.

This disclosure contemplates email 135 being communicated to any appropriate number of users 105. Any number of these users 105 may be more likely to respond to a phishing email and any number of these users 105 may be less likely to respond to a phishing email. As a result, system 100 may delay communicating an email 135 to any appropriate number of users 105.

In some embodiments, phishing management device 140 may delay communicating email 135 to a group of users 105 who are more likely to respond to phishing emails based on a deletion rate of a group of users who are less likely to respond to phishing emails. For example, if the group of users who are less likely to respond to phishing emails has a high deletion rate associated with email 135, phishing management device 140 may determine that email 135 is likely a phishing email and delay indefinitely communicating email 135 to the users 105 who are more likely to respond to phishing emails.

In some embodiments, phishing management device 140 may delay communicating email 135 to a group of users 105 who are more likely to respond to phishing emails based on a number of users of a first group of users who are less likely to respond to phishing emails who clicked a link in email 135. If a large number of users clicked the link in email 135, then phishing management device 140 may determine that email 135 is safe. As a result, phishing management device 140 may communicate email 135 to the group of users who are more likely to respond to phishing emails.

In certain embodiments, phishing management device 140 may delay communicating email 135 to a group of users 105 who are more likely to respond to phishing emails based on a number of users of a first group of users who are less likely to respond to a phishing email who read email 135. For example, if phishing management device 140 determines that a large number of users of the group of users who are less likely to respond to phishing emails read email 135, phishing management device 140 may determine that email 135 is safe. As a result, phishing management device 140 may communicate email 135 to the group of users who are more likely to respond to phishing emails.

In particular embodiments, phishing management device 140 may quarantine email 135 based on how a group of users who are less likely to respond to phishing emails handle 135. For example, if the group of users who are less likely to respond to phishing emails report email 135 as a phishing email, phishing management device 140 may quarantine email 135 so that email 135 may be analyzed. This disclosure contemplates phishing management device 140 quarantining email 135 in any appropriate manner. For example, phishing management device 140 may move email 135 to a different component of system 100 for analysis. When email 135 is quarantined, phishing management device 140 may also prevent email 135 from being further communicated in system 100.

By delaying communication of email 135 to users who are more likely to respond to phishing emails, system 100 may improve the security of system 100 and network 115. In certain instances, users who are more likely to respond to phishing entails may be prevented from receiving future phishing emails using system 100.

FIG. 3 is a flowchart illustrating a method 1200 of delaying phishing emails using the system 100 of FIG. 1. In particular embodiments, phishing management device 140 may perform method 1200.

Phishing management device 140 may begin by receiving an email in step 1205. In particular embodiments, mail server 120 may have communicated the email to phishing management device 140.

In step 1210, phishing management device 140 may select a first subset of a plurality of users who are less likely to respond to phishing emails. In particular embodiments, phishing management device 140 may select this first subset based on the phishing scores of the first subset of users. The phishing scores may indicate that these users are less likely to respond to phishing emails.

In step 1215, phishing management device 140 may select a second subset of the plurality of users who are more likely to respond to phishing emails. In particular embodiments, phishing management device 140 may select the second subset based on the phishing scores of the second subset. The phishing scores may indicate that the second subset is more likely to respond to phishing emails.

Phishing management device 140 may communicate the email to the first subset in step 1220. By communicating the email to the first subset and not the second subset, phishing management device 140 may be able to first determine whether the email is a phishing email before communicating the email to the second subset of users who are more likely to respond to phishing emails.

In step 1225, phishing management device 140 may determine whether it is safe to send the email to the second subset. Phishing management device 140 may make this determination based on the first subset's treatment of the email. For example, if the first subset deleted the email and/or reported the email as a phishing email, phishing management device 140 may determine that it is not safe to send the email to the second subset. On the other hand, if the first subset reads the email, replies to the email and/or saves the email, phishing management device 140 may determine that it is safe to send the email to the second subset.

If phishing management device 140 determines that it is not safe to send the email to the second subset, phishing management device 140 may delay communicating the email to the second subset in step 1235. In particular embodiments, phishing management device 140 may delay indefinitely communicating the email to the second subset if phishing management device 140 determines that the email is a phishing email. In some embodiments, phishing management device 140 may move the email into a folder separate from a folder where the email is placed (e.g., from a delay folder to a received folder) if the email is to be communicated to a user.

If phishing management device 140 determines that it is safe to communicate the email to the second subset, phishing management device 140 may communicate the email to the second subset in step 1230. In particular embodiments, by performing method 1200 phishing management device 140 may improve the security of system 100 and/or a corresponding network.

Modifications, additions, or omissions may be made to method 1200 depicted in FIG. 3. Method 1200 may include more, fewer, or other steps. For example, steps may be performed in parallel or in any suitable order. While discussed as phishing management device 140 performing the steps, any suitable component of system 100, such as device 110 for example, may perform one or more steps of the method.

This disclosure contemplates users 105A, 105B and 105C responding to phishing emails in any appropriate manner. For example, users 105A, 105B and 105C may respond to a phishing email by clicking a link in the phishing email. As another example, users 105A, 105B and 105C may respond to a phishing email by replying to it. As another example, users 105A, 105B and 105C may respond to a phishing email by opening an attachment in the phishing email. As further examples, users 105A, 105B, and 105C may respond by forwarding the phishing email, deleting the phishing email, opening the phishing email, opening the phishing email, reading the phishing email, opening an attachment in the phishing email, calling a phone number in the phishing email, and/or reporting the phishing email.

Modifications, additions, or omissions may be made to system 100 without departing from the scope of the invention. For example, phishing management device 14 may be a distributed system. As another example, the components of system 100 may be integrated or separated. For example, mail server 120 may be incorporated into phishing management device 140, and vice versa.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory configured to store a plurality of phishing scores, each phishing score of the plurality of phishing scores indicating a likelihood that a user of a plurality of users will respond to a phishing email; and
a processor communicatively coupled to the memory, the processor configured to:
receive an email;
select a first subset of the plurality of users based on the phishing score of each user in the first subset;
select a second subset of the plurality of users based on the phishing score of each user in the second subset, wherein each user in the second subset is determined to be more likely to respond to a phishing email than each user in the first subset;
communicate the email to the first subset;
prevent communication of the email to the second subset based on a deletion rate of the email of the first subset;
collect, from the first subset, responses indicating that the email is a phishing email;
quarantine the email based on the first subset's responses to the email;
delay communication of the email to the second subset based on a number of users of the first subset who clicked a link in the email; and
delay communication of the email to the second subset based on a number of users of the first subset who read the email.

2. The apparatus of claim 1, wherein the plurality of phishing scores are determined by analyzing a response rate of a plurality of users to a plurality of phishing emails.

3. The apparatus of claim 1, wherein the processor is further configured to quarantine the email based on the first subset's responses to the email.

4. The apparatus of claim 1, wherein communicating the email to the second subset includes moving the email into a folder separate from a first folder where new mail is placed.

5. A method comprising:
storing, by a memory, a plurality of phishing scores, each phishing score of the plurality of phishing scores indicating a likelihood that a user of a plurality of users will respond to a phishing email;
receiving an email;
selecting, by a processor communicatively coupled to the memory, a first subset of the plurality of users based on the phishing score of each user in the first subset;
selecting, by the processor, a second subset of the plurality of users based on the phishing score of each user in the second subset, wherein each user in the second subset is determined to be more likely to respond to a phishing email than each user in the first subset;
communicating the email to the first subset;
preventing communication of the email to the second subset based on a deletion rate of the email of the first subset;
collecting, from the first subset, responses indicating that the email is a phishing email;
quarantining the email based on the first subset's responses to the email;
delaying communication of the email to the second subset based on a number of users of the first subset who clicked a link in the email; and
delaying communication of the email to the second subset based on a number of users of the first subset who read the email.

6. The method of claim 5, wherein the plurality of phishing scores are determined by analyzing a response rate of a plurality of users to a plurality of phishing emails.

7. The method of claim 5, further comprising quarantining the email based on the first subset's responses to the email.

8. The method of claim 5, wherein communicating the email to the second subset includes moving the email into a folder separate from a first folder where new mail is placed.

9. A system comprising:
a plurality of users; and
a phishing management device configured to:
store, by a memory, a plurality of phishing scores, each phishing score of the plurality of phishing scores indicating a likelihood that a user of a plurality of users will respond to a phishing email;
receive an email;
select, by a processor communicatively coupled to the memory, a first subset of the plurality of users based on the phishing score of each user in the first subset;
select, by the processor, a second subset of the plurality of users based on the phishing score of each user in the second subset, wherein each user in the second subset is determined to be more likely to respond to a phishing email than each user in the first subset;
communicate the email to the first subset;
prevent communication of the email to the second subset based on a deletion rate of the email of the first subset;
collect, from the fir subset, responses indicting that the email is a phishing email;
quarantine the email based on the first subset's responses to the email;
delay communication of the email to the second subset based on a number of users of the first subset who clicked a link in the email; and
delay communication of the email to the second subset based on a number of users of the first subset who read the email.

10. The system of claim 9, wherein the plurality of phishing scores are determined by analyzing a response rate of a plurality of users to a plurality of phishing emails.

11. The system of claim 9, wherein the processor is further configured to quarantine the email based on the first subset's responses to the email.

12. The system of claim 9, wherein communicating the email to the second subset includes moving the email into a folder separate from a first folder where new mail is placed.

\* \* \* \* \*